(12) United States Patent
Smith et al.

(10) Patent No.: US 10,865,737 B2
(45) Date of Patent: Dec. 15, 2020

(54) HIDDEN LINKAGE FOR A TRANSLATING COWL THRUST REVERSER

(71) Applicant: HONEYWELL INTERNATIONAL INC., Morris Plains, NJ (US)

(72) Inventors: Danis Burton Smith, Chandler, AZ (US); Alexandre Guerinot, Phoenix, AZ (US); Remo Neri, Cave Creek, AZ (US); James Thomas Ayers, III, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 395 days.

(21) Appl. No.: 15/689,218

(22) Filed: Aug. 29, 2017

(65) Prior Publication Data

US 2019/0063367 A1 Feb. 28, 2019

(51) Int. Cl.
| | | |
|---|---|---|
| *F02K 1/76* | (2006.01) | |
| *F02K 1/62* | (2006.01) | |
| *F02K 1/60* | (2006.01) | |
| *F02K 1/72* | (2006.01) | |
| *F02K 1/09* | (2006.01) | |

(52) U.S. Cl.
CPC .............. *F02K 1/763* (2013.01); *F02K 1/60* (2013.01); *F02K 1/605* (2013.01); *F02K 1/625* (2013.01); *F02K 1/72* (2013.01); *F02K 1/09* (2013.01); *F05D 2260/50* (2013.01)

(58) Field of Classification Search
CPC ... F02K 1/60; F02K 1/605; F02K 1/70; F02K 1/72; F02K 1/76; F02K 1/62; F02K 1/625; F05D 2240/50
See application file for complete search history.

(56) References Cited

U.S. PATENT DOCUMENTS

| | | | | |
|---|---|---|---|---|
| 2,847,823 | A | | 8/1958 | Brewer |
| 3,036,431 | A | * | 5/1962 | Vdolek .................... F02K 1/625 60/229 |
| 3,050,937 | A | * | 8/1962 | Varnell ...................... F02K 1/76 60/223 |
| 3,500,645 | A | * | 3/1970 | Hom ......................... F02K 1/72 60/229 |
| 3,614,037 | A | * | 10/1971 | Vdolek ...................... F02K 1/62 244/110 B |
| 3,779,010 | A | | 12/1973 | Chamay et al. |
| 4,340,178 | A | | 7/1982 | Lawson |
| 4,410,152 | A | * | 10/1983 | Kennedy ................. F02K 1/563 239/265.27 |

(Continued)

FOREIGN PATENT DOCUMENTS

| | | |
|---|---|---|
| EP | 3193000 A1 | 7/2017 |
| EP | 3205867 A1 | 8/2017 |

OTHER PUBLICATIONS

Extended European Search Report for Application No. 18190869.0 dated Jan. 22, 2019.

*Primary Examiner* — Alain Chau
(74) *Attorney, Agent, or Firm* — Lorenz & Kopf, LLP

(57) ABSTRACT

A system and method for an improved thrust reverser is provided. The provided thrust reverser employs hidden linkage assemblies to decrease drag in the engine exhaust flow and increase turbine engine performance. The hidden linkage assemblies are placed in a space between the blocker door and the transcowl, thereby not affecting the engine exhaust flow.

17 Claims, 5 Drawing Sheets

(56) References Cited

U.S. PATENT DOCUMENTS

| | | | | |
|---|---|---|---|---|
| 5,054,285 A * | 10/1991 | Geidel | ............... | F02K 1/72 239/265.39 |
| 5,309,711 A * | 5/1994 | Matthias | ............... | F02K 1/72 239/265.29 |
| 5,313,788 A * | 5/1994 | Wright | ............... | F02K 1/72 239/265.29 |
| 5,655,360 A * | 8/1997 | Butler | ............... | F02K 1/72 239/265.29 |
| 5,863,014 A * | 1/1999 | Standish | ............... | F02K 1/70 239/265.29 |
| 6,151,885 A * | 11/2000 | Metezeau | ............... | F02K 1/605 239/265.29 |
| 8,109,466 B2 * | 2/2012 | Aten | ............... | F02K 1/72 244/110 B |
| 8,109,467 B2 * | 2/2012 | Murphy | ............... | F02K 1/72 244/110 B |
| 8,793,973 B2 * | 8/2014 | Vauchel | ............... | F02K 1/72 60/226.2 |
| 9,127,623 B2 * | 9/2015 | Peyron | ............... | F02K 1/72 |
| 9,447,749 B2 * | 9/2016 | James | ............... | F02K 1/72 |
| 10,077,739 B2 * | 9/2018 | James | ............... | F02K 1/72 |
| 10,344,709 B2 * | 7/2019 | Smith | ............... | F02K 1/766 |
| 2010/0270428 A1 * | 10/2010 | Murphy | ............... | F02K 1/72 244/110 B |
| 2012/0067024 A1 * | 3/2012 | Vauchel | ............... | F02K 1/763 60/226.2 |
| 2013/0009005 A1 * | 1/2013 | Caruel | ............... | F01D 11/003 244/110 B |
| 2015/0176528 A1 * | 6/2015 | Peyron | ............... | F02K 1/72 239/265.29 |
| 2015/0204272 A1 * | 7/2015 | James | ............... | F02K 1/72 239/265.19 |
| 2016/0305370 A1 | 10/2016 | Wingett et al. | | |
| 2017/0074211 A1 * | 3/2017 | Smith | ............... | F02K 1/72 |

* cited by examiner

HIDDEN LINKAGE FOR A TRANSLATING COWL THRUST REVERSER

TECHNICAL FIELD

The present invention relates to a thrust reverser system for a turbine engine, and more particularly to a hidden linkage arrangement for a translating cowl thrust reverser system.

BACKGROUND

When jet-powered aircraft land, the wheel brakes and the imposed aerodynamic drag loads (e.g., flaps, spoilers, etc.) of the aircraft may not be sufficient to achieve the desired stopping distance. Thus, turbine engines on most jet-powered aircraft include thrust reverser systems. Thrust reverser systems enhance the stopping power of the aircraft by redirecting turbine engine exhaust flow in order to generate reverse thrust.

Traditional thrust reverser systems have two distinct operating states: a forward (or stowed) state, wherein the thrust reverser system typically forms a portion a turbine engine nacelle and forward thrust nozzle; and a reverse (or deployed) state, wherein the thrust reverser system forms a reverse flow path through which it redirects at least a portion of the engine airflow forward and radially outward, to help decelerate the aircraft. The transition between the forward to the reverse state may be achieved by translating a portion of the nacelle aft. The translating portion of the nacelle is often referred to as the translating cowl, or transcowl, and translating the transcowl aft creates an aperture in the nacelle. Internally, blocker doors are typically deployed synchronously with the translation of the transcowl aft. The blocker doors obstruct forward thrust and generate reverse thrust that discharges through the aperture.

In many designs, the blocker doors are pivotally mounted to the transcowl and connected to the body of the turbine engine with linkage rods. Accordingly, in these designs, the linkage rods are exposed within the engine exhaust flow path. Having the linkage rods in the engine exhaust flow path increases drag, and therefore reduces engine performance.

Improvements to thrust reversers that decrease drag and increase engine performance are desirable. Accordingly, a system and method for a translating cowl thrust reverser that removes the linkage rods from the engine exhaust flow path are desirable.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A thrust reverser system for a turbine engine is provided. The thrust reverser system comprising: a stationary structure configured to be mounted to the turbine engine; a transcowl supported by the stationary structure, the transcowl creating a thrust reverser flowpath and translatable (i) axially, relative to the stationary structure, and (ii) between a first position, in which the transcowl abuts the stationary structure, and a second position, in which the transcowl is displaced from the stationary structure to form a reverse flow aperture; a blocker door pivotally mounted, at a pivot axis, to the stationary structure, the pivot axis being perpendicular to a thrust reverser centerline, the blocker door configured for pivoting on the pivot axis between (i) a stowed position, and (ii) a deployed position in which the blocker door directs engine airflow to discharge through the aperture to thereby generate reverse thrust; and a first linkage rod having a first end and a second end, the first linkage rod (a) mechanically coupling, (i) at the first end, the blocker door, to, (ii) at the second end, the transcowl, (b) configured to fit substantially within a cavity between the blocker door and the inner surface of the transcowl outer layer, and (c) positioned a predetermined distance, X, from a first side of a center plane passing through the thrust reverser centerline; and wherein a ratio of X to a radius, R, of the thrust reverser flowpath is from about 0.4 to about 0.7.

Also provided is a method for producing a thrust reverser system for a turbine engine. The method comprising: mounting a stationary structure to the turbine engine; mounting a transcowl having an outer layer on the stationary structure; positioning a first blocker door within a thrust reverser flowpath, the first blocker door being rotatable about a pivot axis that is perpendicular to a thrust reverser flowpath, the first blocker door configured for pivoting between a stowed position and a deployed position; pivotally mounting the first blocker door on the pivot axis; configuring a first linkage rod to fit substantially within a cavity between the blocker door and an inner surface of the transcowl outer layer; positioning the first linkage rod on the blocker door a predetermined distance, X, from a first side of a center plane passing through the thrust reverser centerline; mechanically coupling a first end of the first linkage rod to the blocker door; mechanically coupling a second end of the first linkage rod to the transcowl; and wherein a ratio of X to a radius, R, of the thrust reverser flowpath is from about 0.4 to about 0.7.

In addition, an aircraft is provided, comprising: a turbine engine; and a thrust reverser system, comprising: a stationary structure mounted to the turbine engine; a transcowl supported by the stationary structure, the transcowl creating a thrust reverser flowpath and translatable (i) axially, relative to the stationary structure, and (ii) between a first position, in which the transcowl abuts the stationary structure, and a second position, in which the transcowl is displaced from the stationary structure to form a reverse flow aperture; a blocker door pivotally mounted, at a pivot axis, to the stationary structure, the pivot axis being perpendicular to a thrust reverser centerline, the blocker door configured for pivoting on the pivot axis between (i) a stowed position, and (ii) a deployed position in which the blocker door directs engine airflow to discharge through the aperture to thereby generate reverse thrust; and a first linkage rod having a first end and a second end, the first linkage rod (a) mechanically coupling, (i) at the first end, the blocker door, to, (ii) at the second end, the transcowl, (b) configured to fit substantially within a cavity between the blocker door and the inner surface of the transcowl outer layer, and (c) positioned a predetermined distance, X, from a first side of a center plane passing through the thrust reverser centerline; and wherein a ratio of X to a radius, R, of the thrust reverser flowpath is from about 0.4 to about 0.7.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

The turbine engine is a component of an aircraft's propulsion system that, in cooperation with the thrust reverser, generates thrust by means of an accelerating mass of gas. As an overview, when the thrust reverser is in the forward thrust state with one or more blocker doors stowed, engine exhaust flow moves from the forward end of the turbine engine to the aft end and is discharged as forward thrust. Alternatively, when the thrust reverser is in the reverse thrust state the blocker doors are deployed, the engine exhaust flow is prevented from being discharged in a manner that generates forward thrust, and is instead discharged through an aperture, generating reverse thrust.

Various embodiments are directed to a thrust reverser system that is suitable for an aircraft turbine engine. The embodiments described below are merely examples and serve as a guide for implementing the novel systems and methods herein on any industrial, commercial, military, or consumer turbine engine application. As such, the examples presented herein are intended as non-limiting.

Figure 1:
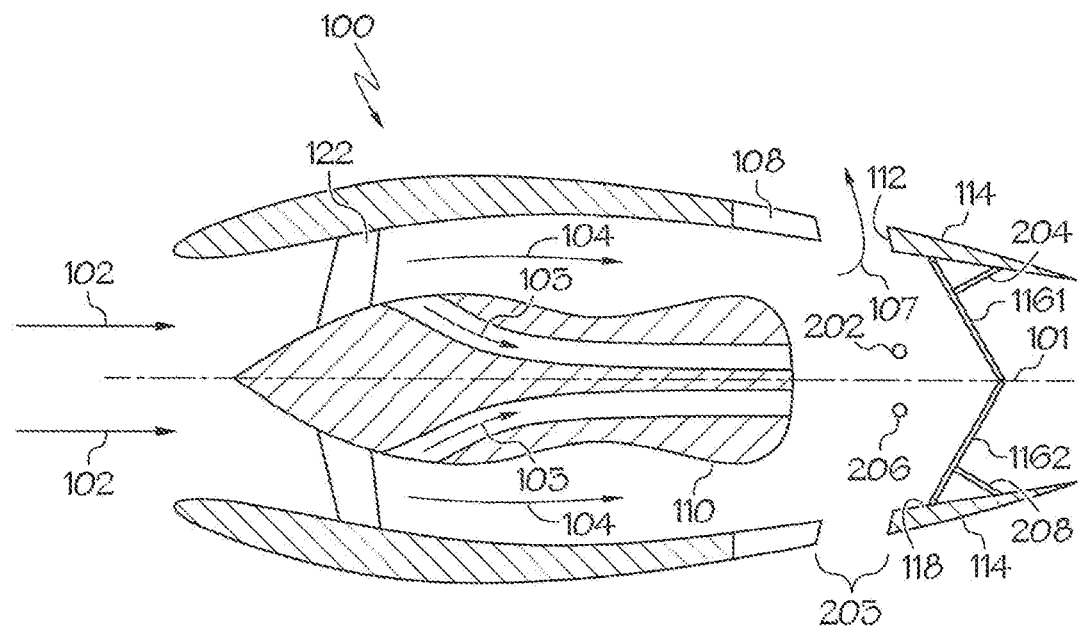
FIG. 1 is a simplified view of an aircraft turbine engine having a thrust reverser in a deployed position, in accordance with various embodiments.
Figure 2:
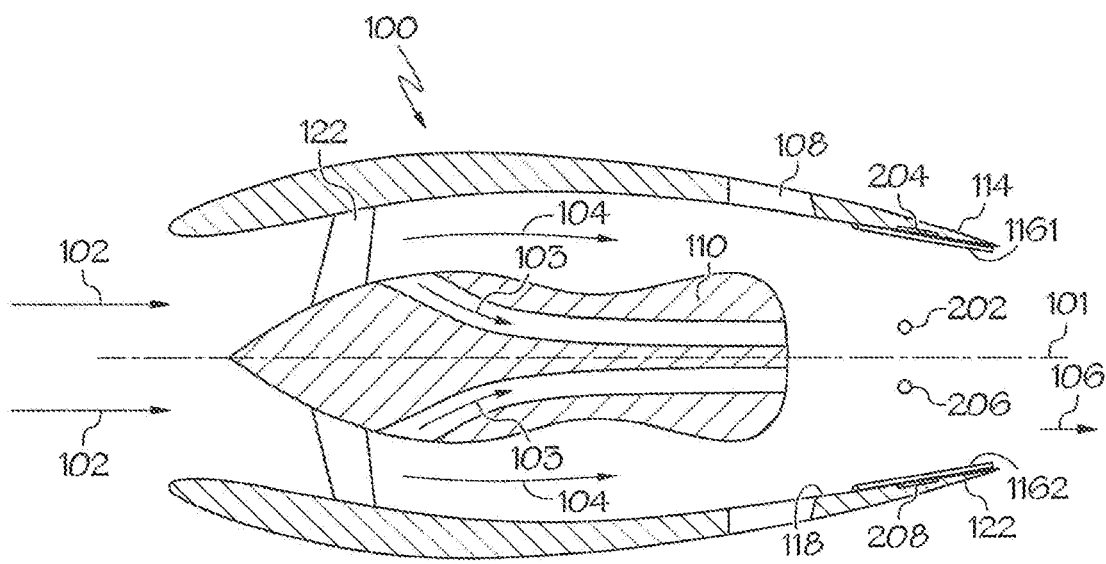
FIG. 2 is a simplified view of the aircraft turbine engine of FIG. 1 showing the thrust reverser in a stowed position.

In FIG. 1 and FIG. 2, a turbine engine 110 is substantially encased within an aerodynamically smooth outer covering, the nacelle 100. Nacelle 100 wraps around the body of the turbine engine 110 and forms an aerodynamically shaped cavity, the thrust reverser flowpath, around a thrust reverser centerline 101, thereby providing direction to engine exhaust flow 106 when the aircraft is generating forward thrust. Ambient air 102 enters the turbine engine and passes through a fan 122. A portion of this air is pressurized, mixed with fuel and ignited, generating hot gasses known as core flow 103. The remainder of this air bypasses the engine core and is known as fan flow 104. Together, fan flow 104 and core flow 103 become the engine exhaust flow 106 that is discharged, generating forward thrust.

Nacelle 100 comprises a thrust reverser system comprising a stationary structure 108 and an annular translatable cowl, or transcowl 114. Transcowl 114 is mounted adjacent to the stationary structure 108 and extends aft therefrom, creating a thrust reverser flowpath. One or more support side beams 402, 404 (FIG. 4) may extend aft from the stationary structure 108 and slidably engage with transcowl 114. The stationary structure 108 has an annular shape and the one or more support beams may be integrated therewith to provide a rigid annular structure to which moveable thrust reverser components (described in detail below) may be mounted. The stationary structure 108 also serves to mount the entire thrust reverser system to the turbine engine 110.

In FIG. 1, the thrust reverser is shown in reverse thrust position. Reverse thrust is achieved by translating the transcowl 114 aft, or axially, from the stationary structure 108, creating a reverse flow aperture 203. Blocker doors 1161 and 1162 are positioned in the thrust reverser flowpath. Concurrent with the transcowl movement, the blocker doors 1161 and 1162 pivot upon pivot axes 202 and 206, respectively. When deployed, blocker doors 1161 and 1162 obstruct the fan flow 104 and/or engine exhaust flow 106, creating a reverse flow path 107 and generating reverse thrust.

In various embodiments, the transition from the forward thrust position to the reverse thrust position occurs as a single, continuous motion, aided by an actuation system. The actuation system generally utilizes a form of a linkage. In various embodiments, the linkages are linkage rods, but in other embodiments, the linkages may be objects other than linkage "rods." In the illustrated embodiment, linkage rod 204 and linkage rod 208 are components of the actuation system. Linkage rod 204 couples blocker door 1161 to the transcowl 114, and linkage rod 208 couples blocker door 1162 to the transcowl 114. The actuation system may comprise additional mechanical and/or electrical components that are not the subject of the present invention.

Figure 3:
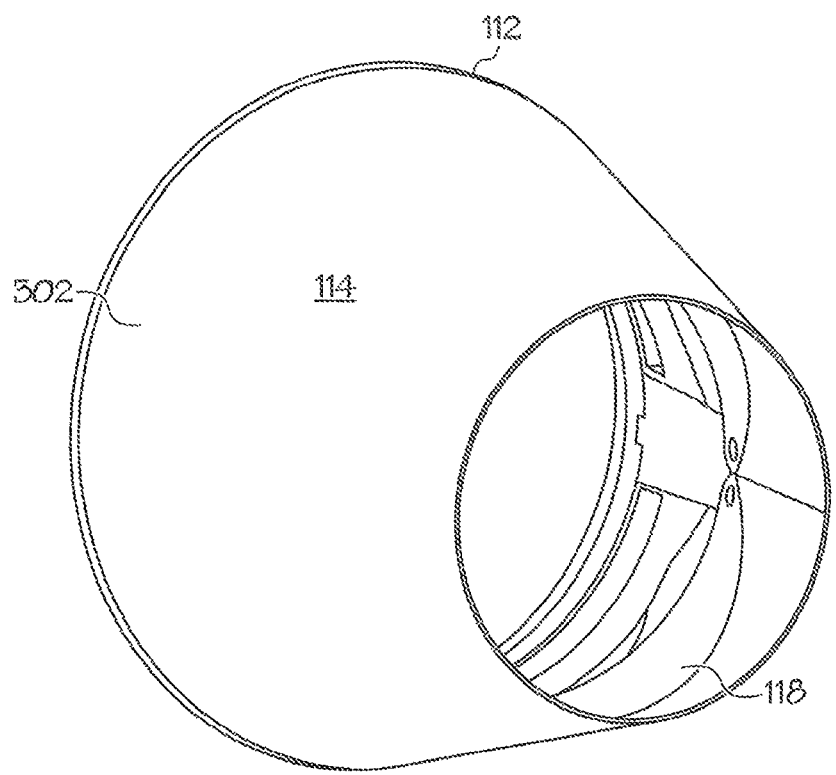
FIG. 3 is a perspective view of the thrust reverser in a stowed position in accordance with various embodiments.
Figure 4:
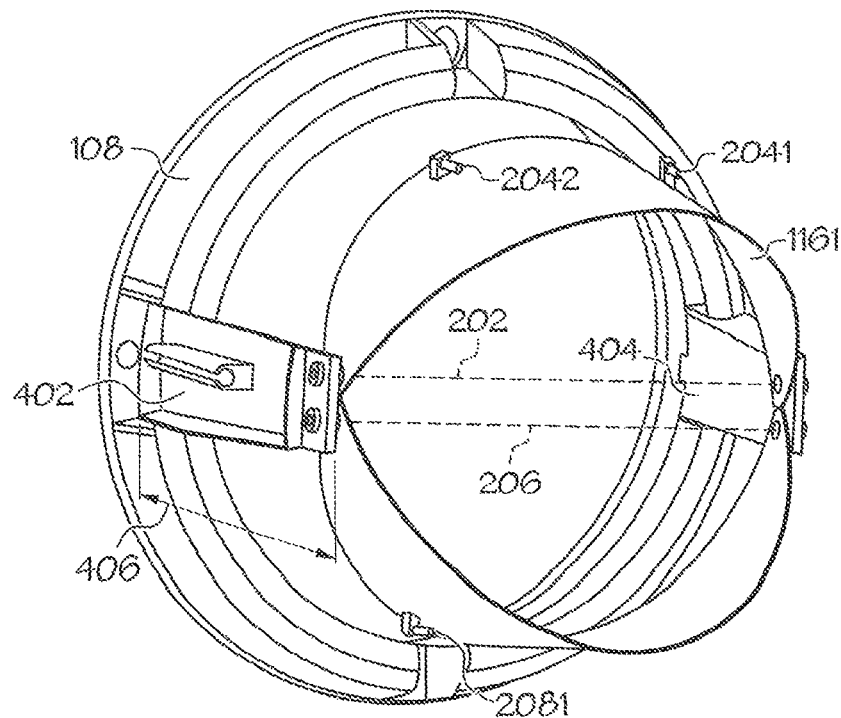
FIG. 4 is a perspective view of the thrust reverser in the stowed position with the transcowl omitted for clarity of illustration.

In FIG. 2, the thrust reverser is shown in a forward thrust position. In the forward thrust position, a front edge 112 of the transcowl 114 abuts with the stationary structure 108, closing the reverse flow aperture 203. During forward thrust, the blocker doors 1161 and 1162 are stowed. When the blocker doors 1161 and 1162 are stowed, they do not interfere with the substantially continuous smooth inner surface 118 of transcowl 114 (FIGS. 2-4). As is described in more detail below, when the blocker doors 1161 and 1162 are stowed, the linkage rods 204 and 208 are stowed in a hidden cavity 650 (FIG. 6) within the transcowl 114.

The relationship between the pivot axis 202 and the pivot axis 206 is that they are parallel and substantially equidistant straddling a plane drawn through the thrust reverser centerline 101. In view of FIG. 1 and FIG. 2, it may be interpreted that the pivot axis 202 is a distance 610 (FIG. 6) "above" a horizontal plane drawn through the thrust reverser centerline 101, and the pivot axis 206 is substantially the same distance 610 (FIG. 6) "below" the horizontal plane. However, a plane may be drawn through the thrust reverser centerline 101 at any angle; the relationship between pivot axis 202 and pivot axis 206 (that they are parallel and substantially equidistant straddling the plane) remains the same.

Figure 5:
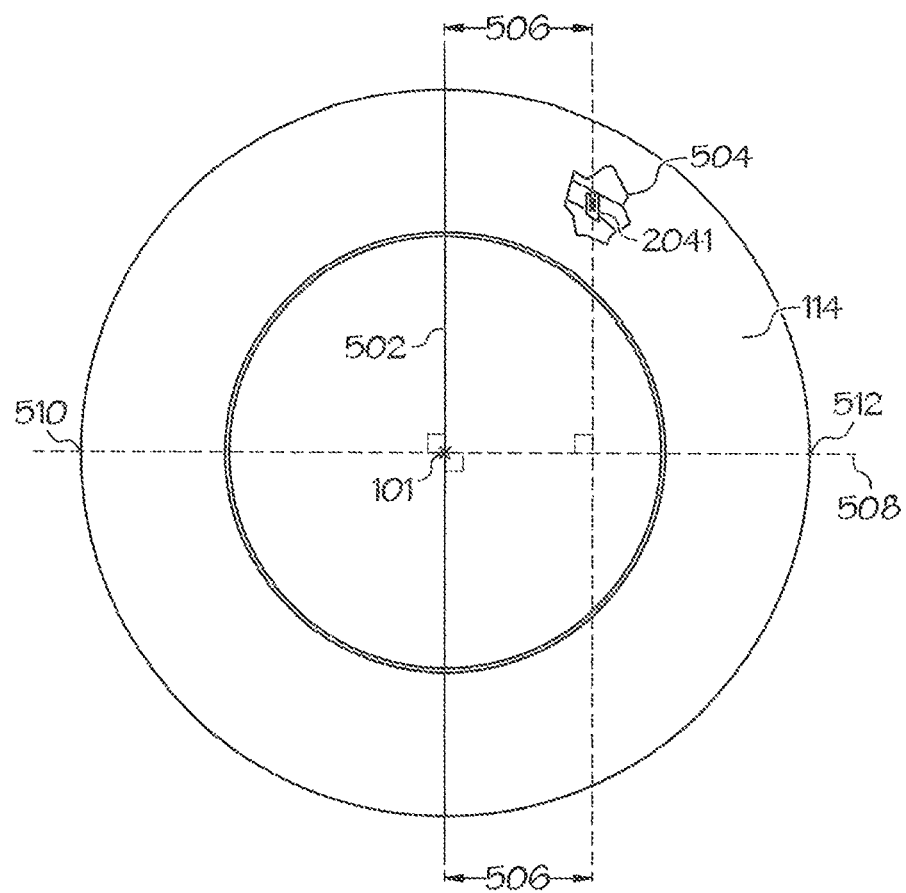
FIG. 5 is the thrust reverser in the stowed position as viewed from the aft, looking forward, with a break-away section to illustrate the linkage arrangement hidden within the transcowl.

FIGS. 3-5, provide perspective views of the thrust reverser in a stowed position, viewed from the aft, looking forward, in accordance with various embodiments. FIG. 3 depicts the transcowl 114 having a smooth outer layer 302, and a smooth inner surface 118, each of which is not interrupted by the linkage rods 204 and 208, or any fastening devices associated therewith.

FIG. 4 is a view of the thrust reverser in FIG. 3 with the transcowl 114 removed. In FIG. 4, there are two side beams (402 and 404) extending aft from the stationary structure 108. The side beams 402 and 404 are located on a circumference of the thrust reverser flowpath, at approximately 180 degrees from each other radially. The side beams 402 and 404 may be coupled to the stationary structure 108, or integrated therewith. Although the side beams 402 and 404 appear as extensions from the stationary structure 108 with observable length 406, in integrated embodiments, length 406 may be minimal or non-existent. In addition, the side beams 402 and 404 are understood to have a plus/minus width sufficient to support the pivot axis 202 and the pivot axis 206. In various embodiments, the pivot axis 202 and the pivot axis 206 are oriented to extend through the side beams 402 and 404, are parallel to each other, and are equidistant from thrust reverser centerline 101.

The upper blocker door 1161 is pivotally mounted on pivot axis 202, and the lower blocker door 1162 is pivotally mounted on pivot axis 206. Although not the subject of the present invention, pivot joints employed at the pivot axis 202 and at the pivot axis 206 may comprise any fastener or fastening assembly capable of enabling a respective blocker door to pivot as described while meeting all attending design requirements. Blocker doors 1161 and 1162 are machined or manufactured to have a shape that permits them to be substantially continuous with the smooth inner surface 118 while stowed, minimizing interference with engine exhaust flow 106. As one with skill in the art will appreciate, various embodiments of pivotally mounted blocker doors 1161 and 1162 are supported. As may be understood with the views provided by FIG. 3 and FIG. 4, the blocker doors 1161 and 1162 may be three-dimensional, for example, having a clamshell shape.

Figure 6:
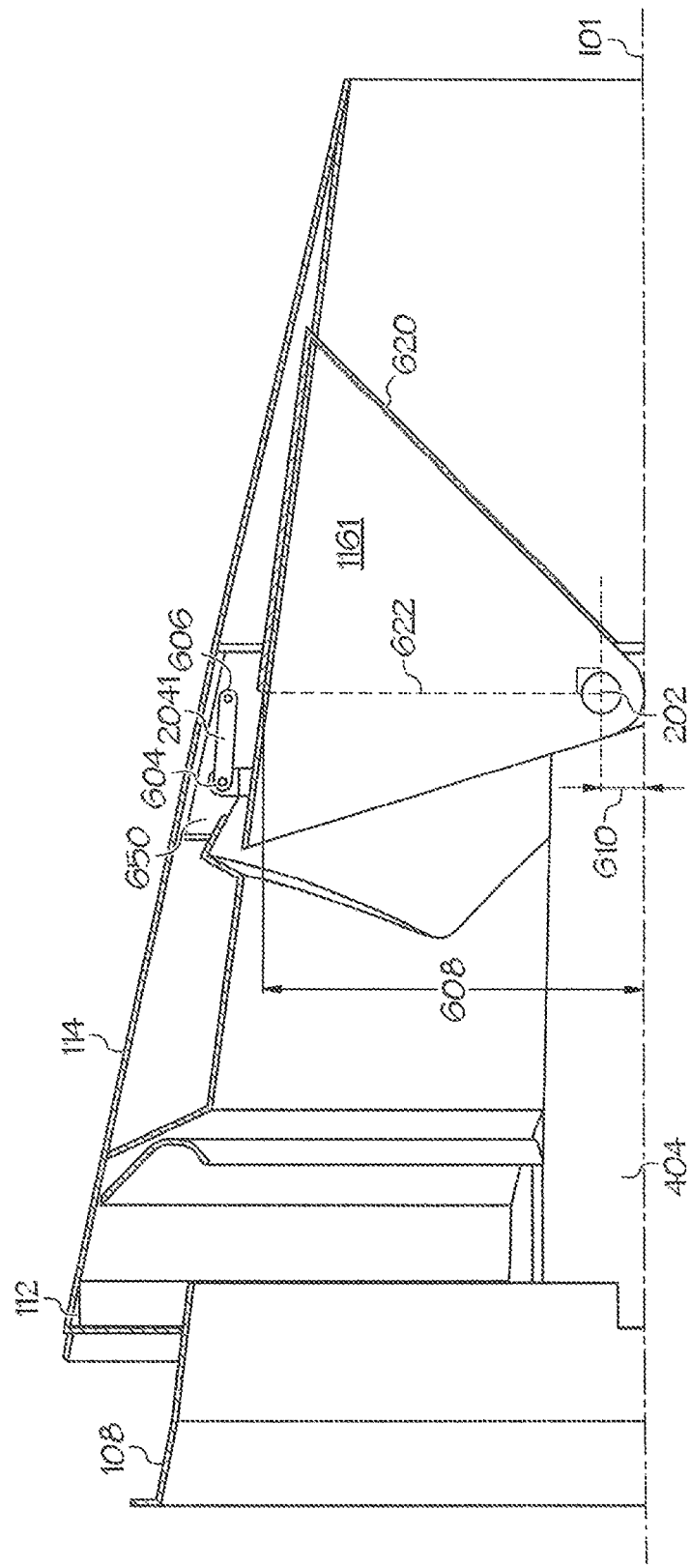
FIG. 6 is a partial cross sectional view, above a thrust reverser centerline, of a thrust reverser system in a forward (stowed) position, in accordance with various embodiments.

With reference to FIG. 4, a linkage rod 2041 and a linkage rod 2042 are each attached to the upper blocker door 1161. A linkage rod 2081 is shown attached to the lower blocker door 1162. Another linkage rod (referred to as 2082 for discussion) is assumed present on the lower blocker door 1162, but obscured by the lower blocker door 1162 in the view depicted in FIG. 4. The linkage rods 2041 and 2042 are part of an actuation system that is coupled to the transcowl 114 so as to achieve coordinated motion of the transcowl 114 and the blocker door 1161. The linkage rod 2041 and associated fasteners required to couple or attach the linkage rod 2041 as described herein comprise one linkage rod assembly. The entire linkage rod assembly for the linkage rod 2041 fits within a hidden cavity 650 (FIG. 6). In the embodiment, the actuation system includes multiple linkage rod assemblies (i.e., at least one for linkage rod 2041, one for linkage rod 2042, one for linkage rod 2081, and one for linkage rod 2082), each of which are configured to fit entirely inside the hidden cavity 650. It is readily understood that hidden cavity 650 may be continuous or discontinuous around the circumference of the transcowl 114. As mentioned, the linkages represented by linkage rods 2041, 2042, 2081, and 2082, may comprise any suitable material, and may include elastic components. Linkage rod placement is described in connection with FIGS. 5-7.

In FIG. 5, a line representing a center plane 502 is shown bisecting the transcowl 114 length-wise. A cut-away depicted at 504 reveals linkage rod 2041 in the hidden cavity 650 (FIG. 6) in the transcowl 114. Linkage rod 2041 is located at a distance, X 506, to the right of the center plane 502. It is to be understood that linkage rod 2042 is located at a distance X 506 to the left of the center plane 502. Likewise, linkage rods 2081 and 2082 are a distance X 506 from the center plane 502. For reference, a line representing another bisecting plane 508 is shown perpendicularly intersecting center plane 502 at the thrust reverser centerline 101. In radial measurement around the thrust reverser centerline 101, clockwise, marker 510 to marker 512 may comprise a "top" half of the transcowl 114 and, clockwise, marker 512 to marker 510 may comprise a "bottom" half of the transcowl 114 (i.e., the two halves completing 360 degrees). In various embodiments, the side beam 402 is substantially centered at the marker 510, and the side beam 404 is substantially centered at the marker 512 location. In FIG. 3-5, the pivot axes 202 and 206 extend horizontally, and the center plane 502 extends vertically. However, it should be recognized that the thrust reverser, when installed on the turbine engine, could be oriented such that the pivot axes 202 and 206 are not horizontal, but are oriented at an angle off of, or relative to, a horizontal. Regardless of the installed orientation of the thrust reverser, the center plane 502 is perpendicular to the pivot axes 202 and 206.

Figure 7:
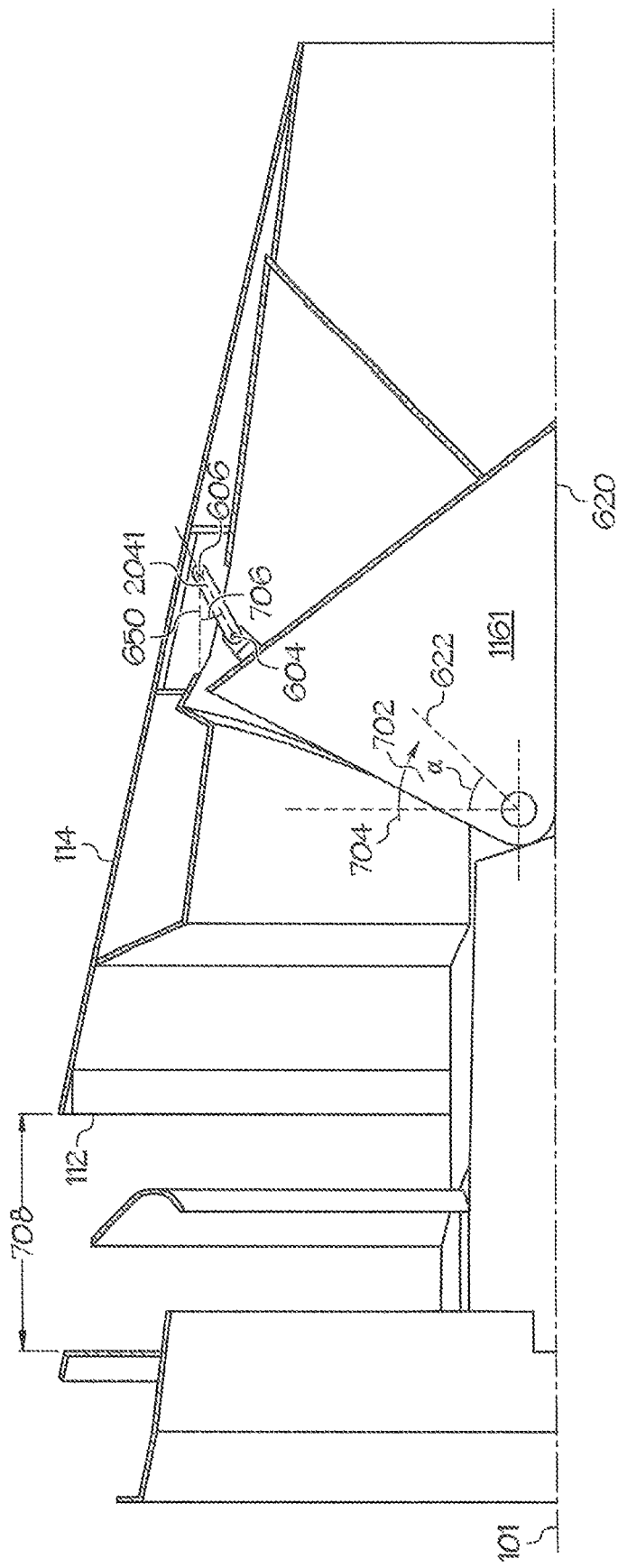
FIG. 7 is a partial cross sectional view, above a thrust reverser centerline, of the thrust reverser system of FIG. 6 in a reverse (deployed) position.

With reference to FIG. 6 and FIG. 7, the linkage rod 2041 is shown coupling an outer surface of the blocker door 1161 at first end 604 to the transcowl 114 at second end 606. The hidden cavity 650 is in a space between a blocker door (such as upper blocker door 1161) and inner surface of the transcowl 114 outer layer 302, i.e., it has a "blocker door side" and a "transcowl 114 side" (also referred to as the "transcowl outer layer 302 side"). In the stowed position, (i) the front edge 112 of the transcowl 114 abuts circumferentially with the annular stationary structure 108, and (ii) on the blocker door side of the hidden cavity 650, the hidden cavity 650 is substantially covered by the respective blocker door. In various embodiments, all included linkage rod assemblies fit into one or more respective hidden cavities 650. Said differently, regardless of a number of linkage rods and/or linkage rod assemblies present, no linkage rod assembly components are found within the engine exhaust flow 106 when the thrust reverser is stowed, or in the reverse flow path 107 when the thrust reverser is deployed. In addition, the linkage rods 2041, 2042, 2081, and 2082 and their associated assemblies also do not mount to the side beams or any other component of the stationary structure 108.

As mentioned, the pivot axis 202, about which blocker door 1161 rotates or pivots, is parallel to a plane passing through the thrust reverser centerline 101, and offset by a distance 610. Regardless of the distance 610, the blocker door 1161 has a radius, R 608, measured from the thrust reverser centerline 101, generally perpendicular to a pivot axis 202 (for the upper blocker door 1161) or 206 (for the lower blocker door 1162). When the transcowl 114 translates aft a distance Y 708, the blocker door 1161 rotates in the direction of arrow 704, and a blocker door edge 620 rotates toward the thrust reverser centerline 101. When the thrust reverser is fully deployed (full axial translation of the transcowl), (i) the blocker door 1161 has rotated in the direction of arrow 704, to a rotation angle 702 from perpendicular, as indicated by dashed line 622, and (ii) the linkage rod 2041 has rotated from a stowed position to a linkage angle 706, and (iii) the transcowl has traveled the distance Y 708.

In various embodiments, the distance Y 708 causes the full rotation angle 702 to be substantially 45 degrees, but may be in a range of 35 to 55 degrees. In response to the full rotation angle 702 being achieved, the linkage angle 706 to be less than or equal to 15 degrees. With reference to FIGS. 5-7, in various embodiments, a ratio of X/R is within the range of 0.4 to 0.7. In various embodiments, a ratio of Y/R is between 0.5 and 0.7.

It may be readily appreciated that the above introduced novel concepts easily adapt to a variety of aircraft turbine engines. Thus there has been provided a system and method for hidden linkage in a thrust reverser system. A person with skill in the art will readily appreciate that a variety of other embodiments may be utilized to provide the intended functionality without straying from the scope of the invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical. Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Some of the embodiments and implementations are described above in terms of functional and/or logical block components or modules. However, it should be appreciated that such block components (or modules) may be realized by any number of hardware, software, and/or firmware components configured to perform the specified functions. To clearly illustrate this interchangeability of hardware and software, these illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

What is claimed is:

1. A thrust reverser system for a turbine engine, comprising:
   a stationary structure configured to be mounted to the turbine engine;
   a transcowl supported by the stationary structure, the transcowl creating a thrust reverser flowpath and translatable (i) axially, relative to the stationary structure, and (ii) between a first position, in which the transcowl abuts the stationary structure, and a second position, in which the transcowl is displaced from the stationary structure to form a reverse flow aperture;
   a blocker door pivotally mounted to the stationary structure, at a stationary pivot axis that is perpendicular to a thrust reverser centerline, the blocker door extending radially around the thrust reverser centerline between opposing ends of the stationary pivot axis, and configured for pivoting on the stationary pivot axis between (i) a stowed position, and (ii) a deployed position in which an inner surface of the blocker door directs engine airflow to discharge through the aperture to thereby generate reverse thrust; and
   a first linkage rod having a first end and a second end, the first linkage rod
      (a) mechanically coupled at the first end of the first linkage rod to an outer surface of the blocker door, and mechanically coupled at the second end of the first linkage rod to the transcowl;
      (b) configured to fit aft of a forward edge of the blocker door and within a cavity between the outer surface of the blocker door and an inner surface of a transcowl outer layer;
      wherein the first linkage rod is positioned on the outer surface of the blocker door a predetermined distance, X, from a first side of a center plane passing through the thrust reverser centerline;
   and further comprising:
   a second linkage rod configured to fit aft of the forward edge of the blocker door and within the cavity between the outer surface of the blocker door and the inner surface of the transcowl outer layer, the second linkage rod
      (a) mechanically coupled to the blocker door at a first end of the second linkage rod,
      (b) mechanically coupled to the transcowl at a second end of the second linkage rod, and
      (c) positioned on the outer surface of the blocker door the predetermined distance X from a second side of the center plane passing through the thrust reverser centerline; and
   wherein a ratio of X to a radius, R, of the thrust reverser flowpath, measured perpendicular to the stationary pivot axis, is between 0.4 and 0.7.

2. The thrust reverser system of claim 1, wherein full axial translation of the transcowl comprises a translation distance, Y, and a ratio of Y to R is between 0.5 and 0.7.

3. The thrust reverser system of claim 2, wherein X and Y are selected such that the blocker door pivots about 45 degrees as the transcowl translates Y.

4. The thrust reverser system of claim 3, wherein X and Y are further selected such that, measured at the second end of the first linkage rod and the second end of the second linkage rod, the first linkage rod and the second linkage rod each pivot less than or equal to 15 degrees as the blocker door pivots from its stowed position to its deployed position.

5. The thrust reverser system of claim 1, wherein, on a blocker door side of the cavity between the outer surface of the blocker door and the inner surface of the transcowl outer layer, the cavity is entirely covered by the blocker door when the blocker door is in the stowed position.

6. The thrust reverser system of claim 5, wherein the blocker door is a first blocker door extending along a top half of the transcowl, the stationary pivot axis is a first stationary pivot axis, and further comprising:
   a second blocker door pivotally mounted to the stationary structure at a second stationary pivot axis that is perpendicular to the thrust reverser centerline and parallel to the first stationary pivot axis, the second blocker door extending radially around the thrust reverser centerline on a bottom half of the transcowl between opposing ends of the second stationary pivot axis, and configured for pivoting on the second stationary pivot axis between (i) a stowed position, and (ii) a deployed position in which an inner surface of the second blocker door directs engine airflow to discharge through the aperture to thereby generate reverse thrust; and
   a third linkage rod
      (a) mechanically coupled to the second blocker door at a first end of the third linkage rod and mechanically coupled to the transcowl at a second end of the third linkage rod,
      (b) configured to fit aft of a forward edge of the second blocker door and within a second cavity between an outer surface of the second blocker door and the inner surface of the transcowl outer layer, and
      (c) positioned on the outer surface of the second blocker door the predetermined distance, X, from the first side of the center plane passing through the thrust reverser centerline.

7. The thrust reverser system of claim 6, further comprising:
   a fourth linkage rod configured to fit aft of the forward edge of the second blocker door and within the cavity between the outer surface of the second blocker door and the inner surface of the transcowl outer layer, the fourth linkage rod
      (a) mechanically coupled to the second blocker door at a first end of the fourth linkage rod, (b) mechanically coupled to the transcowl at a second end of the fourth linkage rod, and
      (c) positioned on the outer surface of the second blocker door the predetermined distance X from the second side of the center plane passing through the thrust reverser centerline.

8. A method for producing a thrust reverser system for a turbine engine, comprising:
   mounting a stationary structure to the turbine engine;
   mounting a transcowl on the stationary structure the transcowl creating a thrust reverser flowpath having a thrust reverser centerline;
   creating a stationary pivot axis that extends across the thrust reverser flowpath and is perpendicular to the thrust reverser flowpath;
   configuring a first blocker door for pivoting on the stationary pivot axis between a stowed position and a deployed position, and extending radially around the thrust reverser centerline between opposing ends of the stationary pivot axis;
   pivotally mounting the first blocker door within the thrust reverser flowpath on the stationary pivot axis;
   configuring a first linkage rod to fit aft of a forward edge of the blocker door and within a cavity between an outside surface of the first blocker door and an inner surface of a transcowl outer layer;
   positioning the first linkage rod on the first blocker door a predetermined distance, X, from a first side of a center plane passing through the thrust reverser centerline;
   mechanically coupling a first end of the first linkage rod to the first blocker door;
   mechanically coupling a second end of the first linkage rod to the transcowl; and
   configuring a second linkage rod to fit aft of the forward edge of the blocker door and within the cavity between the outer surface of the first blocker door and the inner surface of the transcowl outer layer;
   positioning the second linkage rod on the first blocker door the predetermined distance, X, from a second side of the center plane passing through the thrust reverser centerline;
   mechanically coupling a first end of the second linkage rod to the outer surface of the first blocker door;
   mechanically coupling a second end of the second linkage rod to the transcowl; and
   wherein a ratio of X to a radius, R, of the thrust reverser flowpath measured perpendicular to the stationary pivot axis, is between 0.4 and 0.7.

9. The method of claim 8, further comprising configuring the transcowl such that full axial translation is a distance Y, and wherein a ratio of Y to R is from about 0.5 to 0.7.

10. The method of claim 9, further comprising, configuring the first blocker door such that the first blocker door pivots about 45 degrees when the transcowl translates Y.

11. The method of claim 10, further comprising,
   configuring the first and second linkage rods and the first blocker door such that, measured at the second end of the first linkage rod and the second linkage rod, the first linkage rod and the second linkage rod each pivot less than or equal to about 15 degrees as the first blocker door pivots from its stowed position to its deployed position.

12. The method of claim 11, further comprising configuring
   the transcowl such that, on a blocker door side of the cavity, the cavity is entirely covered by the first blocker door when the first blocker door is in the stowed position.

13. An aircraft, comprising:
   a turbine engine; and
   a thrust reverser system, comprising:
      a stationary structure mounted to the turbine engine;
      a transcowl supported by the stationary structure, the transcowl creating a thrust reverser flowpath and translatable (i) axially, relative to the stationary structure, and (ii) between a first position, in which the transcowl abuts the stationary structure, and a second position, in which the transcowl is displaced from the stationary structure to form a reverse flow aperture;
      a blocker door pivotally mounted to the stationary structure at opposing ends of a stationary pivot axis, the stationary pivot axis being perpendicular to a thrust reverser centerline, the blocker door configured for pivoting on the stationary pivot axis between (i) a stowed position, and (ii) a deployed position in which the blocker door directs engine airflow to discharge through the aperture to thereby generate reverse thrust; and a first linkage rod having a first end and a second end, the first linkage rod
  (a) mechanically coupled at the first end of the first linkage rod to the blocker door, and mechanically coupled at the second end of the first linkage rod to the transcowl,
  (b) configured to fit aft of a forward edge of the blocker door and within a cavity between an outer surface of the blocker door and an inner surface of a transcowl outer layer, and
  (c) positioned a predetermined distance, X, from a first side of a center plane passing through the thrust reverser centerline; and further comprising:

a second linkage rod configured to fit substantially aft of the forward edge of the blocker door and within the cavity between the blocker door and the inner surface of the transcowl outer layer, the second linkage rod
  (a) mechanically coupled to the blocker door at a first end of the second linkage rod,
  (b) mechanically coupled to the transcowl at a second end of the second linkage rod, and
  (c) positioned the predetermined distance X from a second side of the center plane passing through the thrust reverser centerline; and
wherein a ratio of X to a radius, R, of the thrust reverser flowpath, measured perpendicular to the stationary pivot axis, is within a range of 0.4 to 0.7.

14. The aircraft of claim 13, wherein full axial translation of the transcowl comprises a translation distance, Y, and a ratio of Y to R is from about 0.5 to 0.7.

15. The aircraft of claim 14, wherein X and Y are selected such that the blocker door pivots about 45 degrees as the transcowl translates Y.

16. The aircraft of claim 15, wherein X and Y are further selected such that, measured at the second end of the first linkage rod and the second linkage rod, the first linkage rod and the second linkage rod each pivot less than or equal to 15 degrees as the blocker door pivots from its stowed position to its deployed position.

17. The aircraft of claim 16, wherein, on a blocker door side of the cavity between the outer surface of the blocker door and the inner surface of the transcowl outer layer, the cavity is entirely covered by the blocker door when the blocker door is in the stowed position.

* * * * *